United States Patent

Rajic et al.

[11] Patent Number: 5,568,582
[45] Date of Patent: Oct. 22, 1996

[54] FIBER OPTIC CONNECTOR

[75] Inventors: Slobodan Rajic, Knoxville; Jeffrey D. Muhs, Lenior City, both of Tenn.

[73] Assignee: Martin Marietta Energy Systems, Inc., Oak Ridge, Tenn.

[21] Appl. No.: 322,797

[22] Filed: Oct. 13, 1994

[51] Int. Cl.⁶ .................................................. G02B 6/36
[52] U.S. Cl. .............................................. 385/95; 385/901
[58] Field of Search ................................. 385/66, 68, 70, 385/73, 80, 84, 95, 99, 901

[56] References Cited

U.S. PATENT DOCUMENTS

| | | | |
|---|---|---|---|
| 3,810,802 | 5/1974 | Buhite et al. | 385/99 |
| 3,870,395 | 3/1975 | Schicketanz | 385/73 |
| 4,124,364 | 11/1978 | Dalgoutte | 385/73 |
| 4,929,562 | 5/1990 | Anderson et al. | 436/126 |

FOREIGN PATENT DOCUMENTS

| | | | |
|---|---|---|---|
| 0078049 | 5/1983 | European Pat. Off. | 385/80 |
| 56-25708 | 3/1981 | Japan | 385/80 |
| 58-194010 | 11/1983 | Japan | 385/80 |
| 60-176003 | 9/1985 | Japan | 385/80 |

*Primary Examiner*—John Ngo
*Attorney, Agent, or Firm*—Louise A. Brambani; Patrick D. Guettner; Harold W. Adams

[57] ABSTRACT

A fiber optic connector and method for connecting composite materials within which optical fibers are imbedded. The fiber optic connector includes a capillary tube for receiving optical fibers at opposing ends. The method involves inserting a first optical fiber into the capillary tube and imbedding the unit in the end of a softened composite material. The capillary tube is injected with a coupling medium which subsequently solidifies. The composite material is machined to a desired configuration. An external optical fiber is then inserted into the capillary tube after fluidizing the coupling medium, whereby the optical fibers are coupled.

2 Claims, 3 Drawing Sheets

5,568,582

FIBER OPTIC CONNECTOR

This invention was made with Government support under Contract DE-AC05-84OR21400 awarded by the United States Department of Energy to Martin Marietta Energy Systems, Inc. and the U.S. Government has certain rights in this invention.

TECHNICAL FIELD

This invention relates to the field of connectors for fiber optics and more specifically to a means and method for locating, aligning and securing fiber optics imbedded in composite materials.

BACKGROUND ART

Composite materials are used extensively today in many applications such as aircraft exteriors. Their weight and strength make these materials very desirable. One drawback in their application, however, is the unpredictability of their mechanical behavior. This unpredictability, however, can be mitigated with the use of optical fibers sensors imbedded within the composite materials. Imbedding the optical fibers presents no technological difficulty, but joining them together with optical fibers in other composite panels does present a problem. The difficulties include locating the optical fiber after the composite panel is machined, and aligning the optical fiber with other connecting optical fibers. Also, the loss of light transmission due to reflections in the coupling area, and debris in the coupling and the optical fibers are of concern.

Therefore, it is an object of the present invention to provide a fiber optic connector and method for use with which fiber optics imbedded in separate panels can be easily joined.

It is another object of the present invention to provide a fiber optic connector and method for use with which provides a means for easily locating imbedded optical fibers after the composite material has been machined.

Further, it is another object of the present invention to provide a fiber optic connector and method for use in which the loss of light transmission is minimized.

It is yet another object of the present invention to provide a fiber optic connector and method for use in which the amount of debris in the coupling and the optical fibers is minimized.

DISCLOSURE OF THE INVENTION

Other objects and advantages will be accomplished by the present invention which serves to provide an fiber optic connector and method for use. The fiber optic connector of the present invention includes a capillary tube which defines a first end, a second end and a tapered portion. The first and second ends respectively receive first and second optical fibers. The capillary tube closely receives the optical fibers. The tapered portion provides a constricted region which serves to center each of the optical fibers such that they are aligned. The capillary tube is filled with a coupling medium such that the first and second optical fibers can couple and transmit light from one to the other.

An optical fiber is placed in one end of the capillary tube and centered. The optical fiber and tube are imbedded into a softened composite material such that second end protrudes from an end of the composite material. A fluid coupling medium is injected into the capillary tube and fills the tube. Upon solidification of the coupling medium the composite material is machined to the desirable size. After being located by virtue of the fluorescent coupling medium, the second end of the capillary tube is heated to fluidize the coupling medium such that a second optical fiber can be inserted into the second end of the capillary tube and centered via the tapered portion whereby the first and second optical fibers are aligned.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A fiber optic connector incorporating various features of the present invention is illustrated generally at 10 in the figures, A method for using the fiber optic connector 10 is also illustrated. The fiber optic connector 10 is designed for join two optical fiber in a manner such that loss of light transmission, as well as debris within the coupling, is minimized. The connector 10 is ideally utilized in the field of composite materials with imbedded optical fibers.

Figure 1:
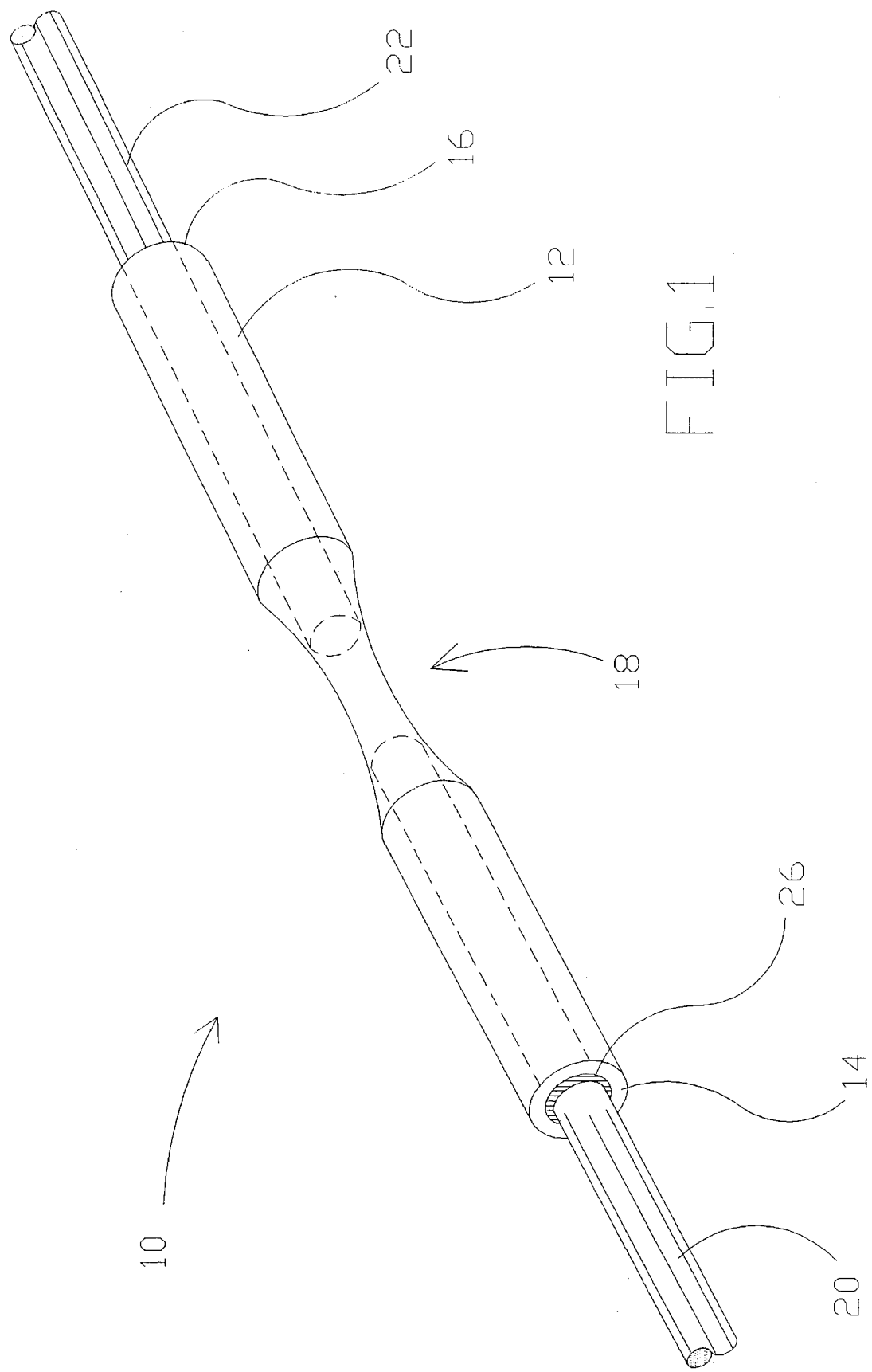
FIG. 1 is a perspective view of the fiber optic connector constructed in accordance with several features of the present invention showing.

The fiber optic connector 10 is generally comprised of a capillary tube 12 defining a first end 14, a second end 16 and a tapered portion 18, as shown in FIG. 1. The tapered portion 18 defines a constricted inner diameter and serves to center the optical fiber 20 within the capillary tube 12. The capillary tube 12 is dimensioned to provide a secure, tight fit for the optical fiber 20. For a typical optical fiber of 125 microns, the preferred inner diameter of the capillary tube 12 is approximately 180 microns and the preferred outer diameter is approximately 350 microns. The inner diameter of the tapered portion 18 tapers to a size smaller than the outer diameter of the optical fiber 20 such that the optical fiber can not move through the capillary tube to the other end. Of course, the dimensions of the capillary tube 12 and the tapered portion can be altered depending upon the size of the optical fiber 20.

The capillary tube 12 should be fabricated from a relatively rigid material with a relatively high melting point. In the preferred embodiment, the capillary tube 12 is fabricated from glass.

The capillary tube 12 is used to join two optical fibers such that they are in optical communication with each other, as shown in FIG. 1. This is accomplished by inserting a first optical fiber 20 in the first end 14 of the capillary tube 12, filling the capillary tube 12 with a fluid coupling medium 26 which is solidifiable and inserting a second optical fiber 22 into the second end 16 of the capillary tube 12. Each of the optical fibers 20, 22 are inserted into the capillary tube 12 to the tapered or constricted portion 18 such that the optical fibers 20, 22 are aligned. Once the coupling medium 26 solidifies, the optical fibers 20, 22 are stably secured within the capillary tube 12.

The capillary tube 12 is also used to connect an external or second optical fiber 22 to an optical fiber 20 imbedded in a panel of composite material 24. The first step for connecting an external optical fiber 22 to an optical fiber 20 imbedded in a panel of composite material 24 is to insert and center a selected optical fiber 20 into the tapered portion 18 through the first end 14 of the capillary tube 12.

Figure 2:
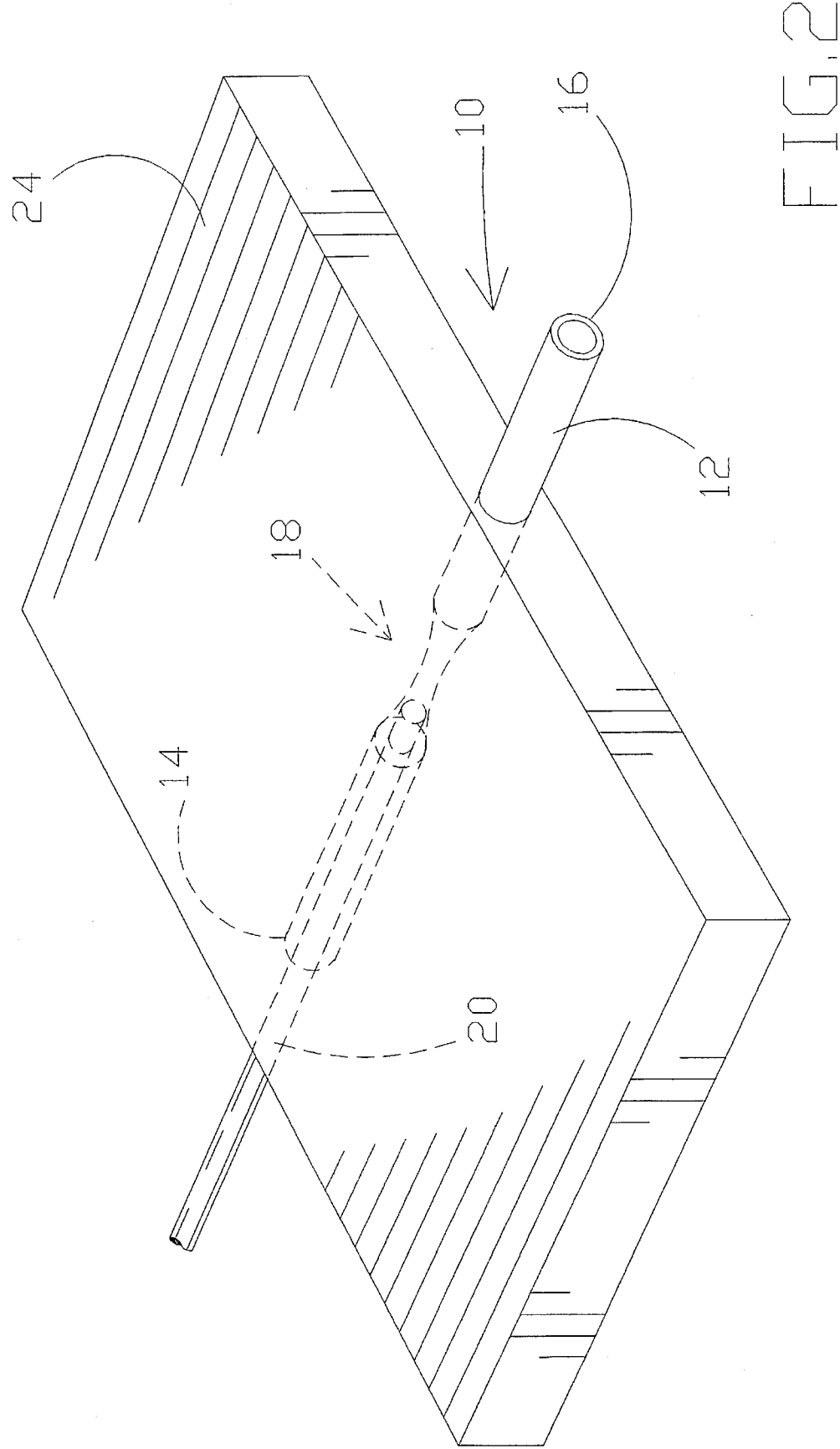
FIG. 2 illustrates a elevation view of a fiber optic connector and an optical fiber imbedded in a composite material.

Subsequently, the optical fiber 20 and the capillary tube 12 are imbedded into a composite material 24 while it is in a soft state and of sufficient thickness to cover the optical fiber 20 and the tube 12. The optical fiber 20 and capillary tube 12 are imbedded in a manner such that at least a portion of the second end 16 of the capillary tube 12 exits at an edge of the composite material 24, as shown in FIG. 2.

Next, a viscous coupling medium 26 is injected into the capillary tube 12 such that the tube 12 is filled. In the preferred embodiment, the coupling medium 26 is fluorescent such that the capillary tube 12 is easily located after the composite material 24 has been machined. In the preferred embodiment, the coupling medium is becomes fluid upon heating and solidifies to a relatively nonpliable state upon cooling. In the preferred embodiment, the coupling medium 26 is wax and most preferably, UNI-WAX #40.

Once the coupling medium 26 hardens, the hardened composite material 24 may be machined to a panel of the desired dimensions.

Figure 3:
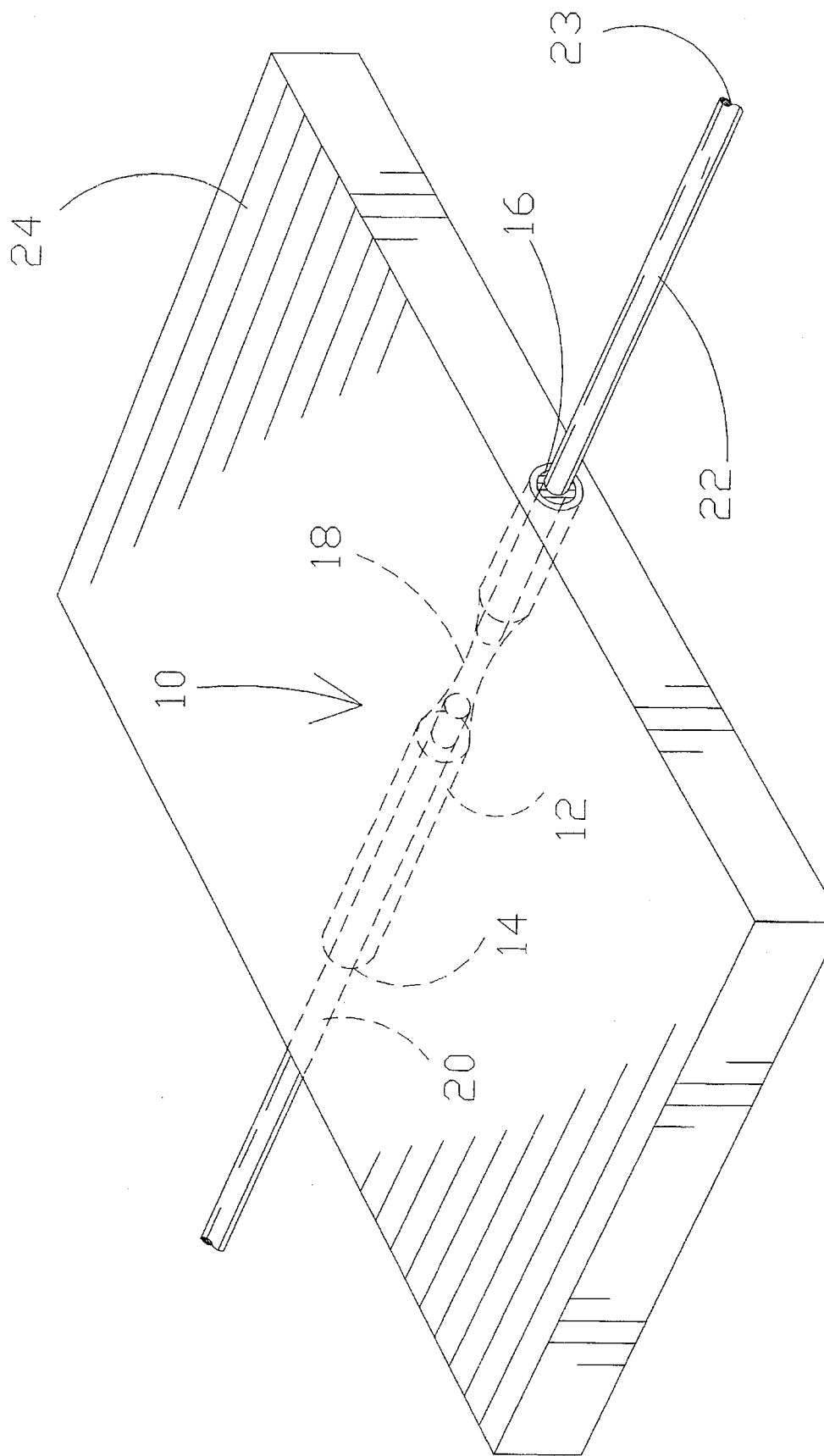
FIG. 3 is a partial view of a machined end of a composite material panel within which the fiber optic connector and optical fiber are imbedded and an exterior optical fiber extending from the fiber optic connector.

Subsequently, the capillary tube 12 is located via the fluorescent coupling medium 26. The coupling medium is fluidized such that an external optical fiber 22 can be inserted into the second end 16 of the capillary tube 12. In the preferred embodiment, the coupling medium 26 is fluidized by heating the area around the exit 16 of the capillary tube 12 to soften the coupling medium 26. The external optical fiber 22 is inserted into the capillary tube 12 such that it is centered in the tube 12 via the tapered portion 18 whereby the external optical fiber 22 and the imbedded optical fiber 20 are aligned, as shown in FIG. 3. Preferably, the external connecting optical fiber 22 is held in position within the capillary tube 12 until the coupling medium 26 hardens.

It will be noted that the second end 23 of the external optical fiber 22 can be joined to another panel by the method described above. In this manner, a plurality of panels can be fitted together and the optical fibers imbedded within each of the panels can communicate one to another.

From the foregoing description, it will be recognized by those skilled in the art that a fiber optic connector and method for use offering advantages over the prior art has been provided. Specifically, the fiber optic connector and method for use provides a means for aligning two optical fibers. Further, the fiber optic connector is ideal for use with imbedded optical fibers in a composite material wherein an external optical fiber is aligned with an imbedded optical fiber. Moreover, the connector and method for use provides a means for locating the connector imbedded in the composite material. The connector and method of use minimizes the loss of light transmissions due to reflections in the coupling area. Further, debris in the coupling and the optical fibers is also minimized.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, We claim:

1. A fiber optic connector for aligning a first optical fiber and a second optical fiber, said fiber optic connector comprising:

a capillary tube defining a first end, a second end and a constricted portion, said capillary tube for receiving the first optical fiber at said first end and the second optical fiber at said second end, said constricted portion defining dimensions for centering each of the optical fibers, said capillary tube receiving a fluid coupling medium which solidifies to hold each of the optical fibers in place, said coupling medium being fluorescent.

2. The fiber optic connector of claim 1 wherein said coupling medium is fluidized by heating said coupling medium.

* * * * *